US010955670B2

(12) United States Patent
Fransson et al.

(10) Patent No.: US 10,955,670 B2
(45) Date of Patent: *Mar. 23, 2021

(54) SYSTEMS, DEVICES, AND METHODS FOR EMBEDDING A DIFFRACTIVE ELEMENT IN AN EYEGLASS LENS

(71) Applicant: GOOGLE LLC, Mountain View, CA (US)

(72) Inventors: Nils Johan Fransson, Waterloo (CA); Eric J. Caliston, Kitchener (CA); Arnett Weber, Waterloo (CA); Michael A. T. Fowler, Kitchener (CA); Robin W. Tsen, Kitchener (CA); Darren Ihmels, Toronto (CA)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/038,444

(22) Filed: Jul. 18, 2018

(65) Prior Publication Data
US 2019/0025597 A1    Jan. 24, 2019

Related U.S. Application Data

(60) Provisional application No. 62/534,099, filed on Jul. 18, 2017.

(51) Int. Cl.
*G02B 27/01* (2006.01)
*G02C 7/02* (2006.01)
(Continued)

(52) U.S. Cl.
CPC .......... *G02B 27/0172* (2013.01); *G02B 1/14* (2015.01); *G02B 27/0176* (2013.01);
(Continued)

(58) Field of Classification Search
CPC ............ G02B 27/0172; G02B 27/0176; G02B 27/4205; G02B 1/14; G02B 2027/015;
(Continued)

(56) References Cited

U.S. PATENT DOCUMENTS 5,470,892 A  11/1995 Gupta et al.
5,907,436 A   5/1999 Perry
(Continued)

OTHER PUBLICATIONS

Non-Final Office Action dated Sep. 13, 2019 for U.S. Appl. No. 16/038,435, 17 pages.
(Continued)

*Primary Examiner* — Jennifer D. Carruth

(57) ABSTRACT

Systems, devices, and methods for embedding a diffractive element in an eyeglass lens are described. A method of embedding a diffractive element in an eyeglass lens includes applying a protective layer to a diffractive element, applying an interface layer to the protective layer, and applying a lens layer to the interface layer. The interface layer and the lens layer are each comprised of a resin material that hardens when cured. The interface layer is of a shape and thickness that adheres well to the protective layer after the interface layer is cured. The lens layer is of a shape and thickness that achieves the desired component shape of the lens after the lens layer is cured.

9 Claims, 5 Drawing Sheets

(51) Int. Cl.
  *G02B 1/14* (2015.01)
  *G02B 27/42* (2006.01)
  *G06F 1/16* (2006.01)
  *G06F 3/01* (2006.01)
  *G06F 3/0487* (2013.01)
  *G02B 1/04* (2006.01)

(52) U.S. Cl.
  CPC ......... *G02B 27/4205* (2013.01); *G02C 7/022* (2013.01); *G06F 1/163* (2013.01); *G06F 3/017* (2013.01); *G06F 3/0487* (2013.01); *G02B 1/041* (2013.01); *G02B 2027/013* (2013.01); *G02B 2027/015* (2013.01); *G02B 2027/0118* (2013.01); *G02B 2027/0174* (2013.01); *G02B 2027/0178* (2013.01); *G02C 2202/20* (2013.01)

(58) Field of Classification Search
  CPC ............ G02B 2027/0178; G02B 1/041; G02B 2027/0174; G02B 2027/0118; G02B 2027/013; G02B 5/1852; G02B 2027/0181; G02B 2027/0183; G02B 27/0103; G02B 2027/0105; G02B 2027/0107; G02B 2027/0109; G02B 2027/011; G02B 2027/0112; G02B 2027/0114; G02B 2027/0116; G02B 2027/012; G02B 2027/0123; G02B 2027/0125; G02B 2027/0127; G02B 2027/0129; G02B 2027/0132; G02B 2027/0134; G02B 2027/0136; G02B 27/01; G02B 27/0101; G02B 27/017; G02B 2027/0152; G02B 2027/014; G06F 1/163; G06F 3/017; G06F 3/0487; G02C 7/022; G02C 2202/20; C08L 69/00; G03H 2001/043; G03H 2240/25; G03H 2270/21
  See application file for complete search history.

(56) References Cited

U.S. PATENT DOCUMENTS

| | | | |
|---|---|---|---|
| 9,897,886 B2 | 2/2018 | Mack et al. | |
| 10,005,248 B2 | 6/2018 | Khine et al. | |
| 10,678,058 B2 | 6/2020 | Fransson et al. | |
| 2005/0007548 A1* | 1/2005 | Ishak | G02C 7/10 351/159.62 |
| 2006/0098164 A1 | 5/2006 | Blum et al. | |
| 2012/0229759 A1 | 9/2012 | Tamura et al. | |
| 2013/0278631 A1 | 10/2013 | Border et al. | |
| 2015/0029589 A1 | 1/2015 | Neauport et al. | |
| 2015/0285967 A1 | 10/2015 | Ventola et al. | |
| 2016/0033771 A1* | 2/2016 | Tremblay | G02B 26/10 345/8 |
| 2016/0220348 A1 | 8/2016 | Argal et al. | |
| 2017/0145137 A1 | 5/2017 | Yamada et al. | |
| 2017/0176644 A1 | 6/2017 | Nakayama | |
| 2017/0326761 A1 | 11/2017 | Springer | |
| 2019/0025592 A1* | 1/2019 | Fransson | G02B 1/14 |
| 2019/0025593 A1* | 1/2019 | Fransson | G02B 5/1852 |
| 2019/0025596 A1* | 1/2019 | Fransson | G02B 27/4205 |
| 2019/0025597 A1* | 1/2019 | Fransson | G06F 1/163 |
| 2019/0025674 A1 | 1/2019 | Hwang | |
| 2019/0025930 A1 | 1/2019 | Fransson et al. | |

OTHER PUBLICATIONS

Notice of Allowance dated Feb. 3, 2020 for U.S. Appl. No. 16/038,435, 13 pages.
Non-Final Office Action dated Apr. 2, 2020 for U.S. Appl. No. 16/038,437, 12 pages.
Notice of Allowance dated Jul. 22, 2020 for U.S. Appl. No. 16/038,437, 8 pages.
Non-Final Office Action dated Apr. 2, 2020 for U.S. Appl. No. 16/038,439, 16 pages.
Notice of Allowance dated Jul. 22, 2020 for U.S. Appl. No. 16/038,439, 8 pages.
Final Office Action dated Jun. 22, 2020 for U.S. Appl. No. 16/038,483, 17 pages.
Non-Final Office Action dated Dec. 11, 2019 for U.S. Appl. No. 16/038,483, 19 pages.
Non-Final Office Action dated Oct. 13, 2020 for U.S. Appl. No. 16/038,483, 24 pages.
Non-Final Office Action dated Apr. 2, 2020 for U.S. Appl. No. 16/038,447, 11 pages.
Notice of Allowance dated Jul. 22, 2020 for U.S. Appl. No. 16/038,447, 7 pages.

\* cited by examiner

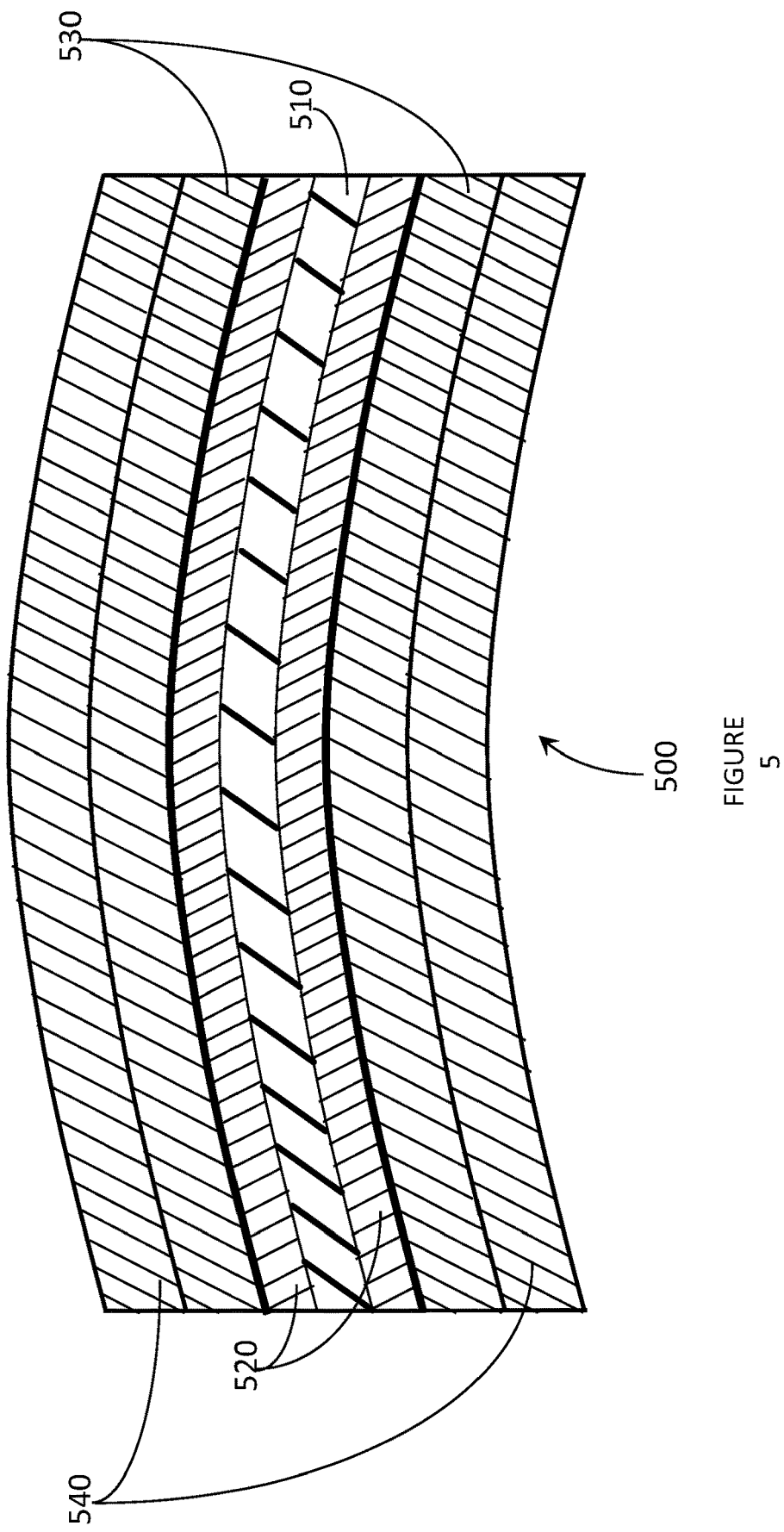

SYSTEMS, DEVICES, AND METHODS FOR EMBEDDING A DIFFRACTIVE ELEMENT IN AN EYEGLASS LENS

TECHNICAL FIELD

The present systems, devices, and methods generally relate to eyeglass lenses and particularly relate to embedding a diffractive element in an eyeglass lens.

BACKGROUND

Description of the Related Art

Eyeglass Lenses

An eyeglass lens is a transparent object that can be mounted in an eyeglass frame. Eyeglass lenses can be convex or concave in order to provide vision correction (prescription lenses) or they can be flat, non-prescription (piano) lenses. Eyeglass lenses are typically made from glass or various types of optical grade plastic, and may be coated to increase scratch resistance, block UV light transmission, or reduce reflections. Eyeglass lenses may be manufactured by a grinding process, wherein material is carefully removed from a preformed "blank" (already of approximately the shape of the lens) to yield a lens with the correct shape. Eyeglass lenses may also be manufactured by a molding process, wherein a mold of the correct shape of the lens is filled with fluid plastic or glass; the fluid is then hardened by cooling or curing the plastic or glass. Once manufactured to the correct shape, eyeglass lenses typically require polishing to achieve a smooth surface.

Diffractive Elements

An optical element is a material which, when exposed to light, refracts, diffracts, attenuates or otherwise modifies the properties of the light. A diffractive element is an optical element that is comprised of a series of ridges or fringes that form an optical element by diffracting light. Non-limiting examples of diffractive elements include a hologram, a holographic optical element, a volume diffraction grating, a surface relief diffraction grating, a transmission grating, or a reflection grating.

Diffractive elements are generally fabricated using light-reactive substances, which when exposed to light under the correct conditions form a series of very small and carefully spaced fringes that function as a diffractive optical element. Non-exclusive examples of light reactive substances are silver-halide emulsions and photopolymers. The small size and careful spacing of the fringes makes the fringes delicate; i.e., any deformation of the diffractive element will cause damage which is generally irreversible. Deformation could be caused by mechanical forces or high temperatures which may cause the fringes or the material between the fringes to melt or expand.

Wearable Heads-UP Displays

A head-mounted display is an electronic device that is worn on a user's head and, when so worn, secures at least one electronic display within a viewable field of at least one of the user's eyes, regardless of the position or orientation of the user's head. A wearable heads-up display is a head-mounted display that enables the user to see displayed content but also does not prevent the user from being able to see their external environment. The "display" component of a wearable heads-up display is either transparent or at a periphery of the user's field of view so that it does not completely block the user from being able to see their external environment. Examples of wearable heads-up displays include: the Google Glass®, the Optinvent Ora®, the Epson Moverio®, and the Sony Glasstron®, just to name a few.

The optical performance of a wearable heads-up display is an important factor in its design. When it comes to face-worn devices, however, users also care a lot about aesthetics. This is clearly highlighted by the immensity of the eyeglass (including sunglass) frame industry. Independent of their performance limitations, many of the aforementioned examples of wearable heads-up displays have struggled to find traction in consumer markets because, at least in part, they lack fashion appeal. Most wearable heads-up displays presented to date employ large display components and, as a result, most wearable heads-up displays presented to date are considerably bulkier and less stylish than conventional eyeglass frames.

A challenge in the design of wearable heads-up displays is to minimize the bulk of the face-worn apparatus will still providing displayed content with sufficient visual quality. There is a need in the art for wearable heads-up displays of more aesthetically-appealing design that are capable of providing high-quality images to the user without limiting the user's ability to see their external environment.

BRIEF SUMMARY

A method of embedding a diffractive element in an eyeglass lens may be summarized as including: encasing the diffractive element with a protective material to produce a diffractive element stack; coating the diffractive element stack with a first amount of resin; at least partially curing the first amount of resin; mounting the at least partially cured diffractive element stack in a mold; filling the mold with a second amount of resin; curing the second amount of resin to produce the eyeglass lens with the diffractive element embedded therein; and removing the eyeglass lens from the mold.

Coating the diffractive element stack with the first amount of resin may include: placing the diffractive element stack in a preliminary mold; and filling the preliminary mold with resin; and the method may further include: removing the diffractive element stack from the preliminary mold after at least partially curing the first amount of resin.

Embedding a diffractive element in an eyeglass lens may further include: increasing a surface energy of the diffractive element stack before coating the diffractive element stack with a first amount of resin. Increasing the surface energy of the diffractive element stack may include at least one process selected from a group consisting of: plasma treatment, UV-ozone treatment, and applying primer to the surface of the protective material. Encasing the diffractive element with a protective material may include encasing the diffractive element with a polycarbonate material.

Embedding a diffractive element in an eyeglass lens may further include thermally annealing the eyeglass lens. Mounting the at least partially cured diffractive element stack in a mold may include mounting the at least partially cured diffractive element stack in a transparent mold. Partially curing the first amount of resin and curing the second amount of resin may include a photo-curing process. Mounting the at least partially cured diffractive element stack in a mold may include adhering the at least partially cured diffractive element stack in the mold with a photo-curable adhesive.

Coating the diffractive element stack with a first amount of resin may include coating the diffractive element stack with a cross-linkable acrylic resin material. Filling the mold with a second amount of resin may include filling the mold with a cross-linkable acrylic resin material. Embedding a diffractive element in an eyeglass lens may further include applying a curvature to the diffractive element.

An eyeglass lens for use in a wearable heads-up may be summarized as including: a diffractive element having a world-side and an eye-side; a world-side protective layer physically coupled to the world-side of the diffractive element; an eye-side protective layer physically coupled to the eye-side of the diffractive element; a first world-side resin layer physically coupled to the world-side protective layer, the first world-side resin layer having a world-side and an eye-side; a second world-side resin layer physically coupled to the world-side of the first world-side resin layer; a first eye-side resin layer physically coupled to the eye-side protective layer, the first eye-side resin layer having a world-side and an eye-side; and a second eye-side resin layer physically coupled to the eye-side of the first eye-side resin layer.

The world-side protective layer may include a world-side surface and an eye-side surface, and wherein the world-side surface of the world-side protective layer may have a higher surface energy than the eye-side surface of the world-side protective layer. The eye-side protective layer may include an eye-side surface and a world-side surface, and wherein the eye-side surface of the eye-side protective layer may have a higher surface energy than the world-side surface of the eye-side protective layer. The diffractive element may include a photopolymer material. The world-side protective layer and the eye-side protective layer may both include a polycarbonate material.

Each of the first world-side resin layer, the first eye-side resin layer, the second world-side resin layer, and the second eye-side resin layer may include a respective thermally-annealed resin layer. Each of the first world-side resin layer, the first eye-side resin layer, the second world-side resin layer, and the second eye-side resin layer may include a respective cross-linked acrylic resin material. The diffractive element may include at least one hologram. The diffractive element may be curved.

A wearable heads-up display may be summarized as including: a support structure that in use is worn on a head of a user; an image source carried by the support structure; an eyeglass lens carried by the support structure, wherein the eyeglass lens is positioned within a field of view of an eye of the user when the support structure is worn on the head of the user, and wherein the eyeglass lens comprises: a diffractive element stack comprising a diffractive element sandwiched between a world-side protective layer and an eye-side protective layer; a first world-side resin layer physically coupled to the world-side protective layer of the diffractive element stack; a second world-side resin layer physically coupled to a world-side of the first world-side resin layer; a first eye-side resin layer physically coupled to the eye-side protective layer of the diffractive element stack; and a second eye-side resin layer physically coupled to an eye-side of the first eye-side resin layer.

The world-side protective layer may include a world-side surface and an eye-side surface. The world-side surface of the world-side protective layer may have a higher surface energy than the eye-side surface of the world-side protective layer. The eye-side protective layer may include an eye-side surface and a world-side surface. The eye-side surface of the eye-side protective layer may have a higher surface energy than the world-side surface of the eye-side protective layer. The diffractive element may be comprised of a photopolymer material. The world-side protective layer and the eye-side protective layer may both be comprised of a polycarbonate material. Each of the first world-side resin layer, the first eye-side resin layer, the second world-side resin layer, and the second eye-side resin layer may include a respective thermally-annealed resin layer. Each of the first world-side resin layer, the first eye-side resin layer, the second world-side resin layer, and the second eye-side resin layer may include a respective cross-linked acrylic resin material. The diffractive element may include at least one hologram. The diffractive element may be curved.

A method of fabricating an eyeglass lens with a diffractive element embedded therein may be summarized as including: applying a protective layer to the diffractive element; applying an interface layer to the protective layer, wherein the interface layer comprises a resin material; and applying a lens layer to the interface layer, wherein the lens layer comprises the resin material, and wherein the interface layer provides adhesion between the protective layer and the lens layer.

Applying the protective layer to the diffractive element may include applying a polycarbonate layer to the diffractive element. Applying the interface layer to the protective layer may include: coating the protective layer with a first amount of the resin material; and at least partially curing the first amount of the resin material. Applying the lens layer to the interface layer may include: mounting the diffractive element in a mold; filling the mold with a second amount of resin; and curing the second amount of resin to produce the eyeglass lens with the diffractive element embedded therein. Mounting the diffractive element in a mold may include mounting the diffractive element in a transparent mold. At least one of at least partially curing the first amount of resin and curing the second amount of resin may include a photo-curing process. Mounting the diffractive element in a mold may include adhering the diffractive element to the mold with a photo-curable adhesive.

A method of fabricating an eyeglass lens with a diffractive element embedded therein may further include: increasing a surface energy of the protective layer before applying the interface layer to the protective layer. Increasing the surface energy of the protective layer may include at least one process selected from a group consisting of: plasma treatment, UV-ozone treatment, and applying primer to the surface of the protective material.

A method of fabricating an eyeglass lens with a diffractive element embedded therein may further include thermally annealing the eyeglass lens. Applying the interface layer to the protective layer may include applying a cross-linkable acrylic resin to the protective layer. Applying the lens layer to the interface layer may include applying a cross-linkable acrylic resin to the interface layer.

A method of fabricating an eyeglass lens with a diffractive element embedded therein may further include applying a curvature to the diffractive element.

An eyeglass lens for use as a transparent combiner in a wearable heads-up display may be summarized as including: an inner layer comprising a diffractive element; a protective layer that encapsulates the diffractive element; an interface layer that encapsulates the protective layer, wherein the interface layer comprises a resin material; and a lens layer that encapsulates the interface layer, wherein the lens layer comprises the resin material, and wherein the interface layer provides adhesion between the protective layer and the lens layer.

The protective layer may include a surface physically coupled to the interface layer and a surface physically coupled to the inner layer, and wherein the surface of the protective layer that is physically coupled to the interface layer has a higher surface energy than the surface of the protective layer that is physically coupled to the inner layer. The diffractive element may include a photopolymer material. The protective layer may include a polycarbonate material.

The interface layer and the lens layer may both be respective thermally-annealed layers. The diffractive element may include at least one holographic optical element. The diffractive element may be curved.

A wearable heads-up display may be summarized as including: a support structure; an image source; and a transparent combiner positioned and oriented to appear in a field of view of an eye of a user when the support structure is worn on a head of the user, the transparent combiner comprising: an inner layer comprising a diffractive element; a protective layer that encapsulates the diffractive element; an interface layer that encapsulates the protective layer, wherein the interface layer comprises a resin material; and a lens layer that encapsulates the interface layer, wherein the lens layer comprises the resin material, and wherein the interface layer provides adhesion between the protective layer and the lens layer.

The protective layer may include a surface physically coupled to the interface layer and a surface physically coupled to the inner layer. The surface of the protective layer that is physically coupled to the interface layer may have a higher surface energy than the surface of the protective layer that is physically coupled to the inner layer. The diffractive element may comprise a photopolymer material. The protective layer may comprise a polycarbonate material. Both the interface layer and the lens layer may be respective thermally-annealed layers. The diffractive element may include at least one holographic optical element. The diffractive element may be curved.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

FIG. 5 is a cross-sectional view of an exemplary eyeglass lens with an embedded diffractive element suitable for use as a transparent combiner in a wearable heads-up display in accordance with the present systems, devices, and methods.

DETAILED DESCRIPTION

Figure 1:
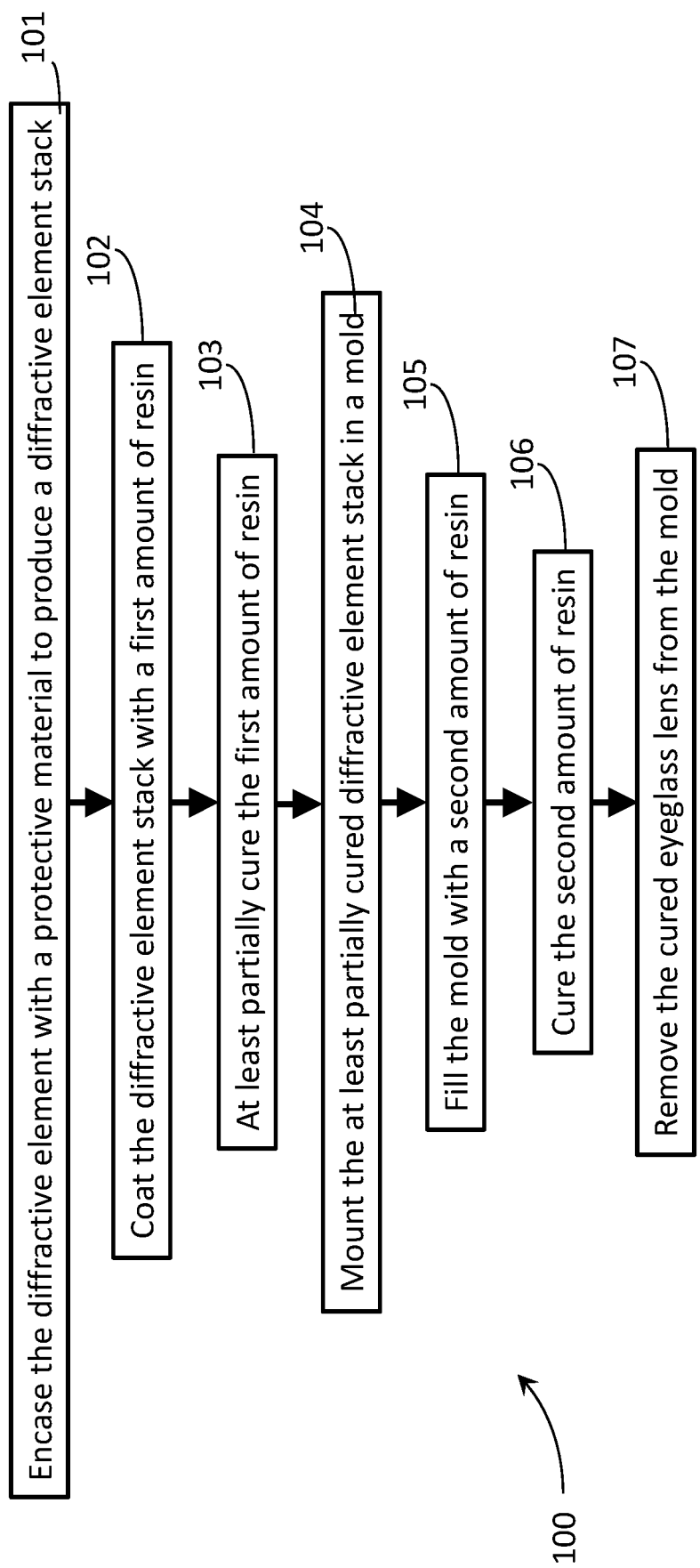
FIG. 1 is a flow-diagram showing a method of embedding a diffractive element in an eyeglass lens in accordance with the present systems, devices, and methods.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

The various embodiments described herein provide systems, devices, and methods for embedding a diffractive element in an eyeglass lens and are particularly well-suited for use in wearable heads-up displays ("WHUDs").

Eyeglass Lenses with Embedded Diffractive Elements

Additional functionality may be imparted to an eyeglass lens by embedding a diffractive element in the eyeglass lens. The additional functionality provided by the diffractive element may, for example, enable the eyeglass lens to be used in advanced optical devices, including performing the role of transparent optical combiner in a WHUD.

Typical methods for embedding a layer of material in an eyeglass lens include hot-pressing, welding, lamination, injection molding, and gluing; typically with the use of high temperature and/or harsh chemicals that allow products to be manufactured quickly and inexpensively. Exposure to high temperature and harsh chemicals will generally deform a diffractive element, causing irreparable loss of optical performance to the diffractive element.

A protective material may be used to protect a diffractive element. A protective material is a material that provides the diffractive element with increased resistance to high temperature and/or harsh chemicals. However, the introduction of a protective material may interfere with the process of embedding the diffractive element in the eyeglass lens; this interference may include preventing good adhesion between the lens and the diffractive element.

In applications for which the diffractive element is delicate and easily damaged, it is generally desirable to embed the diffractive element in the eyeglass lens using a gentle process. For example, a resin material may be used to produce the lens, and the diffractive element may be embedded in the eyeglass lens by placing it within liquid resin and then curing the resin. Curing the resin will ensure that the diffractive element maintains its position within the eyeglass lens.

Curing a resin causes the liquid resin material to harden into a solid (e.g., a crystalline solid such as PET or a glassy solid such as PMMA), where the hardening only occurs when the liquid resin is subjected to specific conditions. Non-limiting examples of conditions that cause liquid resin to harden include raising the temperature of the liquid resin, exposing the liquid resin to air, or exposing the liquid resin to light (e.g., light of a wavelength in a particular waveband, such as ultraviolet light). The conditions that cause curing may be applied for less time and/or with less intensity (e.g., lower temperature or less intense light), in which case the resin may be only partially cured. Partially cured resin may be desirable in some applications, for example to promote adhesion between the partially cured material and another material. Further exposure to conditions that cause curing may then be applied to finish curing the resin. The liquid resin can be poured into a mold before curing, imparting the shape of the mold to the resulting eyeglass lens. If a different eyeglass lens shape is desired, such as a different focal length for a prescription eyeglass lens, the same manufacturing process can be used with little to no modification; typically only the mold needs to be changed.

The optical properties of the cured resin influence the performance of the eyeglass lens. Important optical properties include, but are not limited to: transmittance across the visible light spectrum, resistance to yellowing, and birefringence. Cured resins must also possess any required physical properties such as mechanical strength, shock resistance, thermal stability and chemical stability. Resins typically shrink as they cure, which can complicate their use as an eyeglass lens material. One complication that may result from shrinkage during curing is the introduction of internal stresses to the material during curing, which is caused by the partially cured and already hard material being forced to shrink as it cures further. These internal stresses can be removed by thermally annealing the eyeglass lens after curing. A non-limiting example of a liquid resin that, once cured, possesses necessary physical and optical properties for use as an eyeglass lens that functions as a transparent combiner in a WHUD is cross-linked acrylic resin.

A person of skill in the art will appreciate that there are significant technical challenges inherent in fabricating eyeglass lenses with an embedded diffractive element by curing a liquid resin. Resin casting techniques may use a thermal curing process which requires the lenses to be held at high temperature for long periods of time, irreparably damaging the diffractive element. A non-exclusive example of a curing process that does not require high temperature is photo-curing, where the resin is cured by exposing the resin to light. Photo-curing generally releases significant amounts of heat, which may damage the optically active material if the curing is too fast, however a fast curing speed is generally desirable to increase the speed of the manufacturing process.

The manufacturing of a diffractive element embedded in an eyeglass lens generally requires the use of a protective material which separates the sensitive diffractive element from the harsh chemical and thermal conditions that are found in the resin during curing. This protective material may advantageously meet or exceed the same optical and physical requirements as the resin. Non-exclusive examples of protective materials suitable for use in optical applications include PMMA, MET, triacetate, and polycarbonate.

Manufacturing of an eyeglass lens containing an embedded diffractive element may be performed using a single step casting process; however, in some cases the resulting eyeglass lenses may show an adhesive failure at the interface between the cured resin and the protective layer. This failure is typically caused by a chemical interaction between the protective layer and the resin that inhibits curing of the resin. Inhibition of curing directly at the interface between the protective material and the resin creates a zone of uncured material with very low mechanical strength at the interface. Stresses which pull the material in a particular direction (directional stresses) can develop during the curing of the bulk of the resin and may pull the resin away from the protective material, and because the interface zone has very low mechanical strength the resin may pull away from the protective layer and de-laminate.

To avoid adhesion failures due to "un-cured" resin at the interface between the resin and the protective material, the resin layer may be cured (or "pre-cured") while it is very thin relative to a conventional eyeglass lens. In accordance with the present systems, devices, and methods, a "two-act" curing method may be employed. The first act includes curing a first amount of resin that is of a shape and size such that the resin curing process does not result in de-lamination (e.g., a thin coat of resin), and the subsequent second act includes curing a second amount of resin that is of a shape and size such that it achieves the desired component shape.

FIG. 1 is a flow-diagram showing a method 100 of embedding a diffractive element in an eyeglass lens in accordance with the present systems, devices, and methods. Method 100 includes seven acts 101, 102, 103, 104, 105, 106, and 107 though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments.

At 101, the diffractive element is encased with a protective material to produce a diffractive element stack. The "protective material" described herein is a material that imparts increased stability to the diffractive element as a result of the direct physical coupling between the protective material and the diffractive element. The physical stability of the diffractive element may be increased due to the protective material having higher mechanical strength, preventing the diffractive element from being deformed or torn. The chemical stability of the diffractive element may be increased due to the protective material preventing any chemicals from coming into contact with the diffractive element. Non-exclusive examples of protective materials suitable for use in optical applications include polymethyl methacrylate (PMMA), polyethylene terephthalate (PET), and polycarbonate.

The surface energy of the protective material can influence how effectively the liquid resin covers the protective material, where increasing the surface energy of the protective material such that the surface energy of the protective material is greater than the surface tension of the liquid resin may improve the ability of the resin to cover the surface of the protective material. Non-exclusive examples of treatment techniques that increase the surface energy of the protective material include plasma treatment, UV-ozone treatment, and applying primer to the surface of the protective material.

The necessity of act 101 depends on the nature of the diffractive element. There are implementations in which a protective material may not be necessary and, therefore, act 101 is optional.

In some implementations, the diffractive element may be carried on or by another structure, and such other structure may, for example, provide at least some of the functionality of a protective material described above. For instance, one or more diffractive elements may be carried on or by a waveguide or lightguide structure and may serve as, for example, an in-coupler or out-coupler for such waveguide or lightguide structure. In such implementations, at least a portion (or an entirety) of the waveguide or lightguide structure may be embedded in the eyeglass lens, and additional protective material may or may not be necessary. Thus, for the purposes of the present systems, device, and methods, including the appended claims, the term "diffractive element stack" includes a diffractive material and a combination of optional additional layers or structures such as protective material, waveguide/lightguide structures, substrates, etc. depending on the specific implementation. Likewise, when the term "diffractive element" is used, the diffractive element may be carried on or by other structures or layers, or may itself carry other structures or layers, depending on the specific implementation.

At 102, the diffractive element stack is coated with a first amount of resin. The term "coating" refers to the application of some amount of resin to at least one surface of the diffractive element stack, though generally it may be advantageous to apply resin to all surfaces of the diffractive element stack such that the resin completely encapsulates the diffractive element stack. Non-exclusive examples of coating methods include dip-coating, spray-coating, spin coating, and placing the diffractive element stack in a mold then filling the mold with resin.

At 103, the first amount of resin is at least partially cured. Non-limiting examples of conditions that cause liquid resin to harden include raising the temperature of the liquid resin, exposing the liquid resin to air, or exposing the liquid resin to light (e.g., light of a wavelength in a particular waveband, such as ultraviolet light). The conditions that cause curing may be applied for less time and/or with less intensity (e.g., lower temperature or less intense light), in which case the resin may be only partially cured. Partially cured resin may be desirable in some applications, for example to promote adhesion between the partially cured material and another material. Further exposure to conditions that cause curing may then be applied to finish curing the resin. A chemical interaction between the protective layer and the first amount of resin may inhibit curing of the first amount of resin, in which case the conditions that cause curing may be applied for more time and/or with greater intensity.

At 104, the diffractive element stack with an at least partially cured first amount of resin is placed in a mold. If the curing process for the resin includes a photo-curing process then curing may involve exposing the resin to light and the mold may advantageously be transparent to allow the light to reach the resin.

The mounting of the diffractive element stack with an at least partially cured first amount of resin in the mold may be performed using a flexible adhesive that holds the diffractive element at a fixed position relative to at least one part of the mold. The position may then be fixed by curing the adhesive by a photo-curing process.

At 105, the mold is filled with a second amount of resin.

At 106, the second amount of resin is cured. When the first amount of resin is not completely cured at act 103, the curing of the first amount of resin may be finished or completed during the curing of the second amount of resin at 106.

At 107, the cured eyeglass lens with the diffractive element embedded therein is removed from the mold.

Stress crazing is a phenomenon which can occur during the eyeglass lens production process. Stress crazing is caused by stresses in the eyeglass lens created during the curing of the resin and subsequent cooling of the eyeglass lens to room temperature, and may result in very small cracks appearing within the internal volume of the eyeglass lens. Stress crazing may create a hazy appearance in the eyeglass lens and may reduce the transparency of the eyeglass lens, and is therefore generally undesirable. Stress crazing can be reduced or eliminated by thermally annealing the eyeglass lens, where the eyeglass lens is placed in a relatively high-temperature environment for an extended period of time. The annealing temperature is typically above the typical operating temperature for the resin material but below the glass transition temperature of the resin material; a non-limiting example of annealing temperatures for a resin material is 60° C. to 110° C. for crosslinked PMMA. The annealing time may be as short as 30 minutes and as long as 24 hours; higher annealing temperatures allow for shorter annealing times to achieve the same reduction in stress crazing.

Eyeglass lenses are typically manufactured with a curved shape. To accommodate this, in some implementations the diffractive element may be formed into a curved shape to more easily fit within the internal volume of the eyeglass lens. However, in alternative implementations the diffractive element (or diffractive element stack) may retain a planar geometry when embedded in a curved eyeglass lens.

Figure 2:
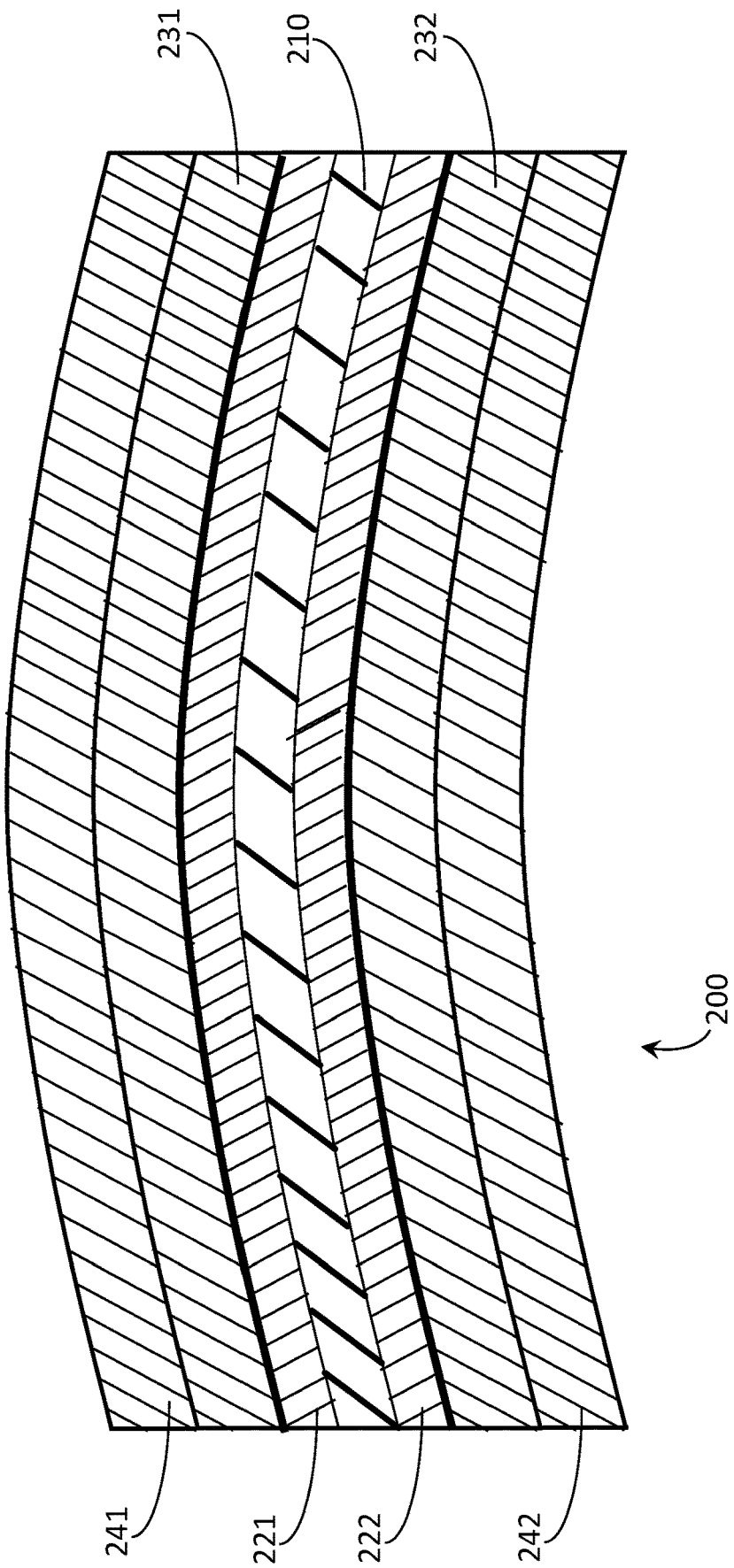
FIG. 2 is a cross-sectional view of an exemplary eyeglass lens with an embedded diffractive element suitable for use as a transparent combiner in a wearable heads-up display in accordance with the present systems, devices, and methods.

FIG. 2 is a cross-sectional view of an exemplary eyeglass lens 200 with an embedded diffractive element 210 suitable for use as a transparent combiner in a WHUD in accordance with the present systems, devices, and methods. Eyeglass lens 200 may be produced by method 100. Eyeglass lens 200 may be formed into a shape suitable for use as an eyeglass lens blank, and subsequently processed (e.g., by grinding) to apply a prescription curvature. Alternatively, eyeglass lens 200 may be molded to embody a prescription curvature. Throughout this specification and the appended claims, the term "eye-side" refers to the side of the eyeglass lens that, when employed in a device worn by a user, faces towards the eye of the user, while the term "world-side" refers to the side of the eyeglass lens that, when employed in a device worn by a user, faces away from the eye of the user and towards the outside world.

Diffractive element 210 is embedded as an inner layer of eyeglass lens 200, however diffractive element 210 is not necessarily physically located at the center of eyeglass lens 200. Diffractive element 210 may be comprised of a photopolymer material. Diffractive element 210 may include at least one hologram, where the hologram performs the function of the optical element. Diffractive element 210 may be formed into a curved shape to allow it to better fit within the inner volume of eyeglass lens 200.

Diffractive element 210 is encapsulated by or sandwiched between world-side protective layer 221 and eye-side protective layer 222. World-side protective layer 221 is physically coupled to the world-side of diffractive element 210 and eye-side protective layer 222 is physically coupled to the eye-side of diffractive element 210. World-side protective layer 221 covers the entirety of the world-side of diffractive element 210 and eye-side protective layer 222 covers the entirety of the eye-side of diffractive element 210; in addition, protective layers 221 and 222 may be physically coupled to each other (e.g., at and/or beyond the edges of diffractive element 210) if diffractive element 210 does not extend in all directions to the edges of eyeglass lens 200. World side protective layer 221 and eye-side protective layer 22 may each comprise a polycarbonate material.

Protective layers 221 and 222 are encapsulated by or sandwiched between first world-side resin layer 231 and first eye-side resin layer 232. First world-side resin layer 231 and first eye-side resin layer 232 provide the interface(s) between protective layers 221, 222 and the main volume of eyeglass lens 200 and, accordingly, are sometimes referred to as "interface layers" (or collectively, as the "interface layer") throughout this specification and the appended claims. First world-side resin layer 231 is physically coupled to the world-side of world-side protective layer 221. First eye-side resin layer 232 is physically coupled to the eye-side of eye-side protective layer 222. First world-side resin layer 231 covers the entirety of the world-side of world-side protective layer 221 and first eye-side resin layer 232 covers the entirety of the eye-side of eye-side protective layer 222; in addition first resin layers 231 and 232 (i.e., the interface layer) may be physically coupled to each other (e.g., at and/or beyond the edges of protective layers 221 and 222) if world-side protective layer 221 and eye-side protective layer 222 do not extend in all directions to the edges of eyeglass lens 200. First world-side resin layer 231 and first eye-side resin layer 232 may each comprise a cross-linkable acrylic resin.

First resin layers 231 and 232 are encapsulated by or sandwiched between second world-side resin layer 241 and second eye-side resin layer 242. Second world-side resin layer 241 and second eye-side resin layer 242 provide the remaining volume of eyeglass lens 200 and, accordingly, are sometimes referred to as "lens layers" (or collectively, as the "lens layer") throughout this specification and the appended claims. Second world-side resin layer 241 is physically coupled to the world-side of first world-side resin layer 231. Second eye-side resin layer 242 is physically coupled to the eye-side of first eye-side resin layer 232. Second world-side resin layer 241 covers the entirety of the world-side of first world-side resin layer 231 and second eye-side resin layer 242 covers the entirety of the eye-side of first eye-side resin layer 232; in addition second resin layers 241 and 242 (i.e., the lens layer) may be physically coupled to each other (e.g., at and/or beyond the edges of first resin layers 231 and 232) if first world-side resin layer 231 and first eye-side resin layer 232 do not extend in all directions to the edges of eyeglass lens 200. Second world-side resin layer 241 and second eye-side resin layer 242 may each comprise a cross-linkable acrylic resin.

The world-side of world-side protective layer 221 may be treated to have a higher surface energy than the eye-side of first resin layer 231. The higher surface energy may improve adhesion between the world-side of world-side protective layer 221 and the eye-side of first resin layer 231. The eye-side of eye-side protective layer 222 may be treated to have a higher surface energy than the world-side of first resin layer 232. The higher surface energy may improve adhesion between the eye-side of eye-side protective layer 222 and the world-side of first resin layer 232.

First world-side resin layer 231, first eye-side resin layer 232, second world-side resin layer 241, and second eye-side resin layer 242 (e.g., eyeglass lens 200 as a whole) may be thermally annealed to at least reduce internal stresses.

Figure 3:
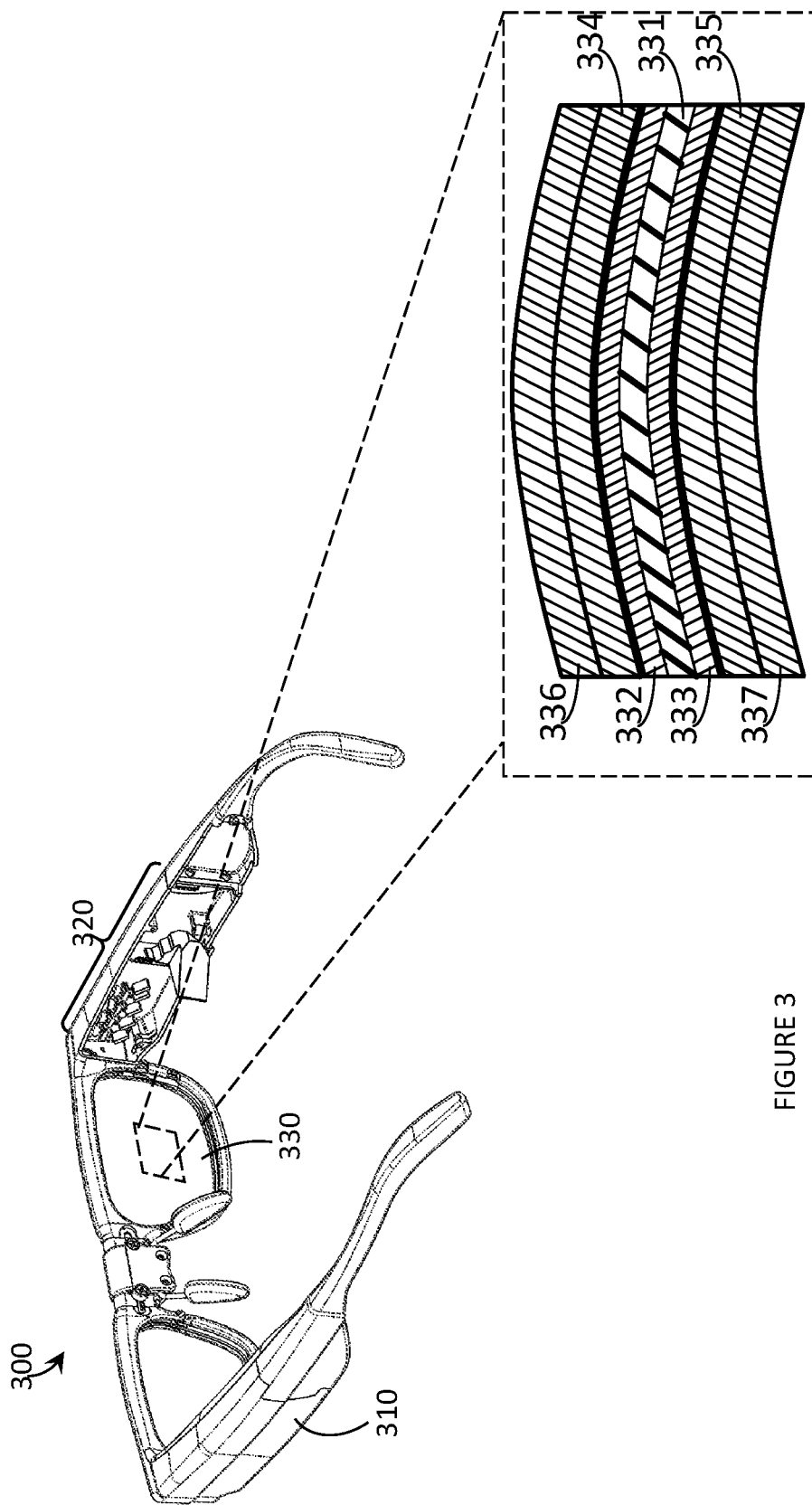
FIG. 3 is a partial-cutaway perspective view of a wearable heads-up display that includes an eyeglass lens with an embedded diffractive element in accordance with the present systems, devices, and methods.

FIG. 3 is a partial-cutaway perspective view of a WHUD 300 that includes an eyeglass lens 330 with an embedded diffractive element 331 in accordance with the present systems, devices, and methods. Eyeglass lens 330 may be substantially similar to eyeglass lens 200 from FIG. 2. WHUD 300 comprises a support structure 310 that is worn on the head of the user and has a general shape and appearance of an eyeglasses (e.g., sunglasses) frame. Support structure 310 carries multiple components, including: an image source 320, and an eyeglass lens 330. Image source 320 is positioned and oriented to direct light towards the eyeglass lens and may include, for example, a micro-display system, a scanning laser projection system, or another system for generating display images. FIG. 3 provides a partial-cutaway view in which regions of support structure 310 have been removed in order to render visible portions of image source 320 and clarify the location of image source 320 within WHUD 300. Eyeglass lens 330 is positioned within a field of view of an eye of the user when the support structure is worn on the head of the user and serves as both a conventional eyeglass lens (i.e., prescription or non-prescription depending on the needs of the user) and a transparent combiner.

FIG. 3 includes a detailed top-down view of eyeglass lens 330. Diffractive element 331 is the innermost layer of eyeglass lens 330 with reference to the individual layers that make up eyeglass lens 330, however diffractive element 331 is not necessarily physically located at the center of eyeglass lens. Similar to the structure of eyeglass lens 200, in eyeglass lens 330 diffractive element 331 is encapsulated by or sandwiched between protective layers 332, 333, which are themselves encapsulated by or sandwiched between interface layers 334, 335, which are themselves encapsulated by or sandwiched between lens layers 336, 337.

Throughout this specification and the appended claims, the term "layer" generally refers to a thickness of some material that provides and/or is spread over a surface, such as a stratum or a coating on a surface. A layer may include or cover a single side or face of a structure, such as a dielectric layer in a printed circuit board or a layer of cheese on a pizza, or a layer may include or cover multiple sides or faces of a three-dimensional structure, such as a layer of clothing or a layer of planet Earth (e.g., the crust, mantle, etc.). Consequently, a layer does not need to be a planar substrate. A person of skill in the art will appreciate that the material of one layer may form the surface of another layer.

Figure 4:
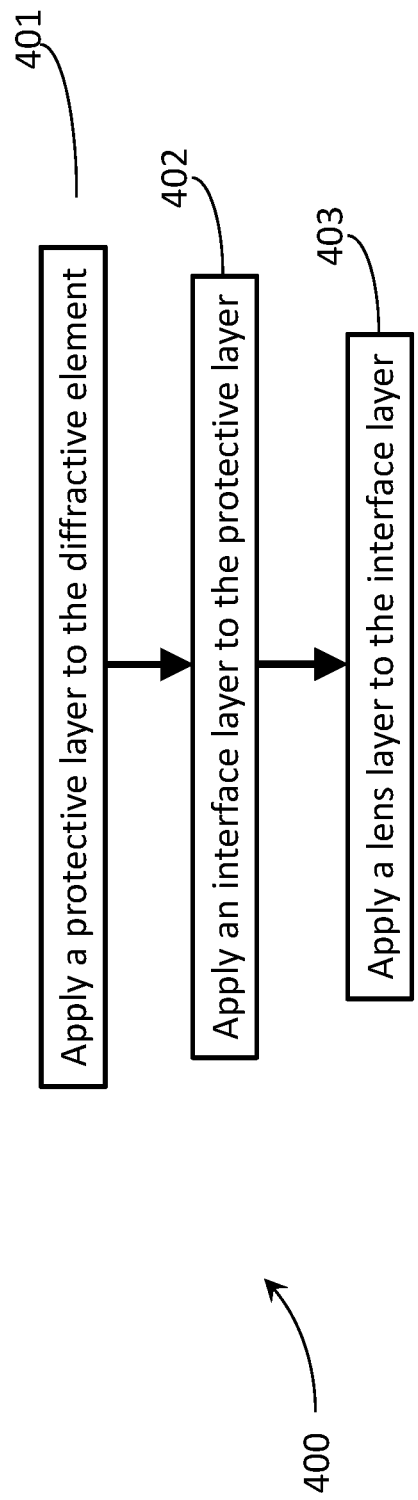
FIG. 4 is a flow-diagram showing a method of embedding a diffractive element in an eyeglass lens in accordance with the present systems, devices, and methods.

FIG. 4 is a flow-diagram showing a method 400 of embedding a diffractive element in an eyeglass lens in accordance with the present systems, devices, and methods. Method 400 includes three acts 401, 402 and 403 though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments.

As an illustrative example of the physical elements of method 400, analogous structures from FIG. 3 are called out in parentheses throughout the description of acts 401, 402, and 403.

At 401, a protective layer (332, 333) is applied to the diffractive element (331). The protective material may be a polycarbonate material. The diffractive element (331) may be of a curved shape, so that the diffractive element (331) is better able to fit entirely within the inner volume of a curved eyeglass lens (330). As described previously, in some implementations that diffractive element may be a part of a diffractive element stack in which the function of the protective layer (332, 333) is already achieved, in which case act 401 may be omitted.

At 402, an interface layer (334, 335) is applied to the protective layer (332, 333). The interface layer (334, 335)

may be applied to the protective layer (332, 333) by coating a first amount of resin onto the protective layer (332, 333) and then at least partially curing the first amount of resin. Curing the resin may be accomplished by photo-curing the resin. The surface energy of the protective material may be increased before applying the interface layer (334, 335).

The interface layer (334, 335) is of a size and shape that minimizes the development of directional stresses during curing such that the interface layer (334, 335) remains adhered to the protective layer (332, 333) during curing. In this way, the interface layer (334, 335) generally improves adhesion between the protective layer (332, 333) and the resin material of the eyeglass lens (330). A non-exclusive example of a size that minimizes the development of directional stresses during curing is a thin layer (<1 mm). A non-exclusive example of a shape that minimizes the development of directional stresses during curing is a layer with substantially constant thickness, where substantially constant thickness is defined as the thickest part of the layer being no more than double the thickness of the thinnest part of the layer.

At 403, a lens layer (336, 337) is applied to the interface layer (334, 335). The lens layer (336, 337) may be applied by mounting the at least partially cured diffractive element stack (331, 332, 333) in a mold, filling the mold with a second amount of resin, and curing the second amount of resin. The eyeglass lens (330) may then be removed from the mold. The lens layer (336, 337) is of a shape such that the lens (330) has an eyeglass shape. The eyeglass lens (330) may be thermally annealed to reduce the internal stresses in the interface layer (334, 335) and the lens layer (336, 337). The temperature for thermal annealing must not exceed the maximum safe temperature for the diffractive element. For example, the maximum safe temperature for the diffractive element may be 200° C., 120° C., 90° C., or 60° C., depending on the diffractive element material. Mounting the at least partially cured diffractive element stack (331, 332, 333) may be performed using an adhesive that is photo-cured.

As described previously, method 400 may produce an eyeglass lens with a diffractive element embedded therein (such as eyeglass lens 200 from FIG. 2 or eyeglass lens 330 from FIG. 3) in a similar way to method 100 from FIG. 1. FIG. 5 provides illustrative clarification of the "encapsulating" nature of the protective layer, interface layer, and lens layer applied in method 400.

FIG. 5 is a cross-sectional view of an exemplary eyeglass lens 500 with an embedded diffractive element 510 suitable for use as a transparent combiner in a WHUD in accordance with the present systems, devices, and methods. Eyeglass lens 500 may be produced by method 400. Eyeglass lens 500 may be formed into a shape suitable for use as an eyeglass lens blank, and subsequently processed (e.g., by grinding) to apply a prescription curvature. Alternatively, eyeglass lens 500 may be molded to embody a prescription curvature.

Eyeglass lens 500 comprises an inner layer 510 which may include, for example, a photopolymer material. The diffractive element may be recorded in or otherwise carried by the inner layer (e.g., a holographic optical element including one or more hologram(s), a diffraction grating, or similar). In some implementations, inner layer 510 may be carried on or by a waveguide or lightguide structure. Inner layer 510 is encapsulated by protective layer 520, which may include, for example, a polycarbonate material. Protective layer 520 is encapsulated by interface layer 530, which may include, for example, a first thickness of resin material. Interface layer 530 is encapsulated by lens layer 540, which may include, for example, a second thickness of the same resin material. Advantageously, interface layer 530 may be substantially thinner than lens layer 540. For example, the thickness of interface layer 530 may be less than 34%, less than 10%, or less than 5% of the thickness of lens layer 540. In accordance with the present systems, devices, and methods, the relative thinness of interface layer 530 compared to lens layer 540 enables interface layer 530 to be more reliably and completely cured and improves adhesion between the resin material of eyeglass lens 500 and protective layer 520.

A person of skill in the art will appreciate that the various embodiments for embedding a diffractive element in an eyeglass lens described herein may be applied in non-WHUD applications. For example, the present systems, devices, and methods may be applied in non-wearable heads-up displays and/or in other applications that may or may not include a visible display.

In some implementations, one or more optical fiber(s) may be used to guide light signals along some of the paths illustrated herein.

The WHUDs described herein may include one or more sensor(s) (e.g., microphone, camera, thermometer, compass, altimeter, and/or others) for collecting data from the user's environment. For example, one or more camera(s) may be used to provide feedback to the processor of the WHUD and influence where on the display(s) any given image should be displayed.

The WHUDs described herein may include one or more on-board power sources (e.g., one or more battery(ies)), a wireless transceiver for sending/receiving wireless communications, and/or a tethered connector port for coupling to a computer and/or charging the one or more on-board power source(s).

The WHUDs described herein may receive and respond to commands from the user in one or more of a variety of ways, including without limitation: voice commands through a microphone; touch commands through buttons, switches, or a touch sensitive surface; and/or gesture-based commands through gesture detection systems as described in, for example, US Patent Application Publication No. US 2014-0198034 A1, U.S. Patent Application Publication No. US 2014-0198035 A1, US Patent Application Publication No. US 2015-0370326 A1, and/or US Patent Application Publication No. US 2017-0097753 A1, all of which are incorporated by reference herein in their entirety.

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet which are owned by Thalmic Labs Inc., including but not limited to: U.S. Provisional Patent Application Ser. No. 62/534,099, U.S. patent application Ser. No. 15/946,549, U.S. patent application Ser. No. 15/946,557, U.S. patent application Ser. No. 15/946,562, U.S. patent application Ser. No. 15/946,565, U.S. patent application Ser. No. 15/946,569, US Patent Application Publication No. US 2014-0198034 A1, US Patent Application Publication No. US 2014-0198035 A1, US Patent Application Publication No. US 2015-0370326 A1, and/or US Patent Application Publication No. US 2017-0097753 A1, US Patent Application Publication No. US 2017-0068095 A1, and PCT Patent Application Publication No. WO 2017-106692 A1, are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An eyeglass lens for use as a transparent combiner in a wearable heads-up display, the eyeglass lens comprising:
   an inner layer comprising a diffractive element;
   a protective layer that encapsulates the diffractive element;
   an interface layer that encapsulates the protective layer, wherein the interface layer comprises a resin material; and
   a lens layer that encapsulates the interface layer, wherein the lens layer comprises the resin material, and wherein the interface layer provides adhesion between the protective layer and the lens layer, wherein both the interface layer and the lens layer are respective thermally-annealed layers.

2. The eyeglass lens of claim 1 wherein the protective layer includes a surface physically coupled to the interface layer and a surface physically coupled to the inner layer, and wherein the surface of the protective layer that is physically coupled to the interface layer has a higher surface energy than the surface of the protective layer that is physically coupled to the inner layer.

3. A wearable heads-up display (WHUD) comprising the eyeglass lens of claim 2, and further comprising a support structure that in use is worn on a head of a user, an image source carried by the support structure, and wherein the eyeglass lens is carried by the support structure and positioned within a field of view of an eye of the user when the support structure is worn on the head of the user.

4. The eyeglass lens of claim 1 wherein the diffractive element comprises a photopolymer material.

5. The eyeglass lens of claim 1 wherein the protective layer comprises a polycarbonate material.

6. The eyeglass lens of claim 1 wherein the diffractive element includes at least one holographic optical element.

7. A wearable heads-up display (WHUD) comprising the eyeglass lens of claim 6, and further comprising a support structure that in use is worn on a head of a user, an image source carried by the support structure, and wherein the eyeglass lens is carried by the support structure and positioned within a field of view of an eye of the user when the support structure is worn on the head of the user.

8. The eyeglass lens of claim 1 wherein the diffractive element is curved.

9. A wearable heads-up display (WHUD) comprising the eyeglass lens of claim 1, and further comprising a support structure that in use is worn on a head of a user, an image source carried by the support structure, and wherein the eyeglass lens is carried by the support structure and positioned within a field of view of an eye of the user when the support structure is worn on the head of the user.

* * * * *